Nov. 10, 1953     E. W. KAISER     2,658,527
CONDUIT SYSTEM
Original Filed Nov. 22, 1943     2 Sheets-Sheet 1
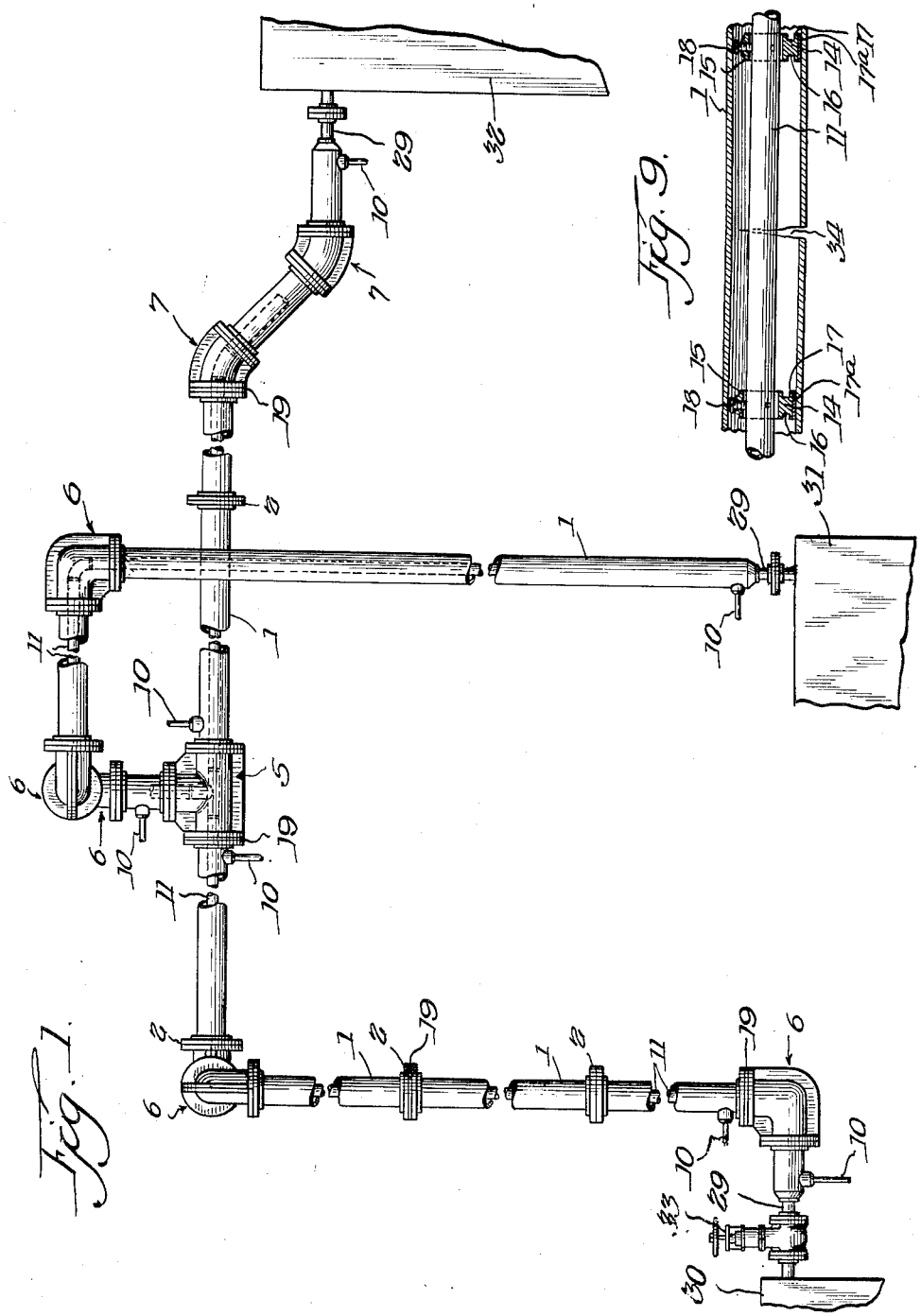
Inventor.
Edward W. Kaiser.
By W. F. Kellogg    Atty.

Nov. 10, 1953     E. W. KAISER     2,658,527
CONDUIT SYSTEM
Original Filed Nov. 22, 1943     2 Sheets-Sheet 2
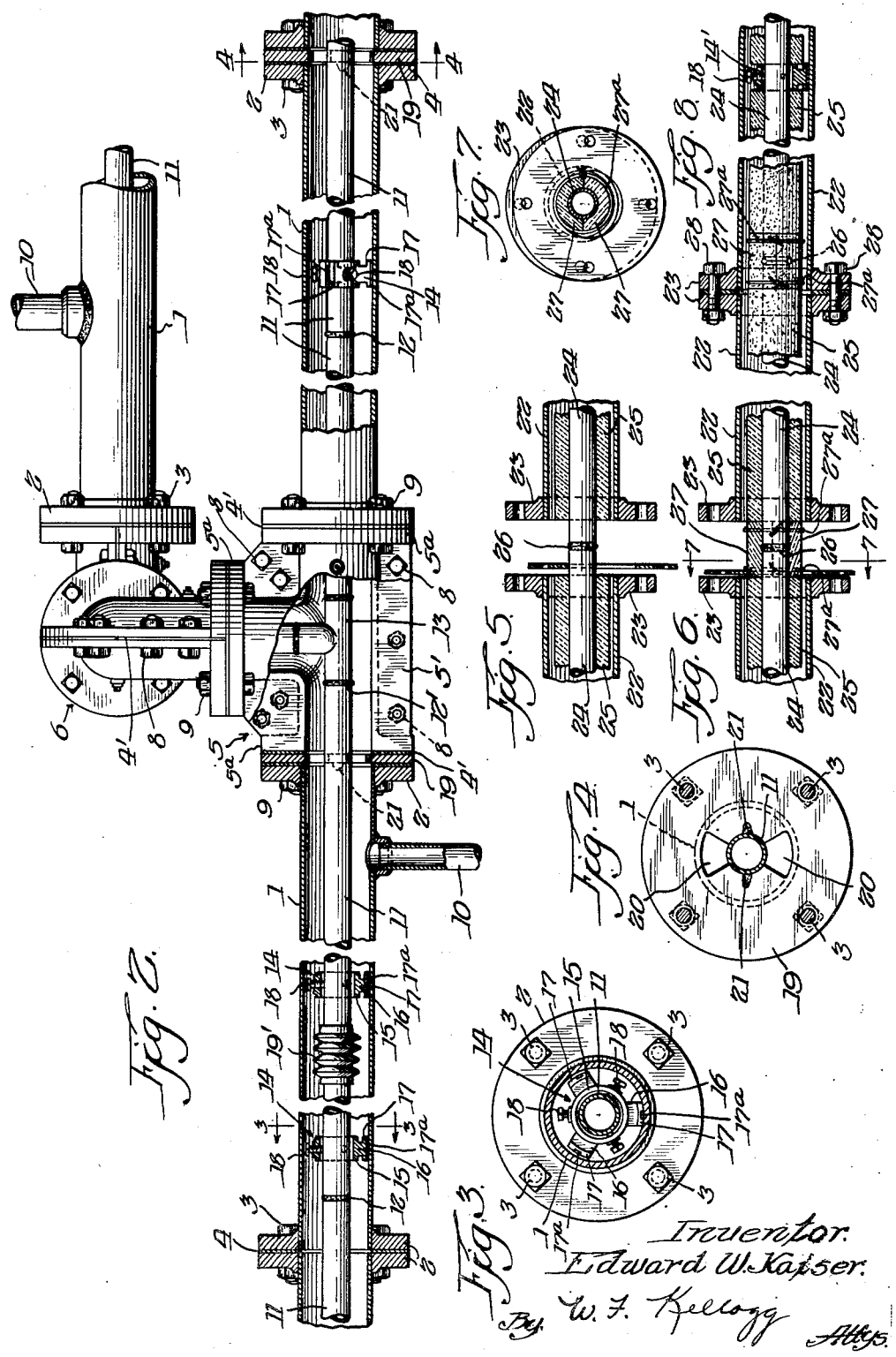

Patented Nov. 10, 1953

2,658,527

UNITED STATES PATENT OFFICE 2,658,527

CONDUIT SYSTEM

Edward W. Kaiser, Chicago, Ill.

Original application November 22, 1943, Serial No. 511,366. Divided and this application September 4, 1948, Serial No. 47,851

14 Claims. (Cl. 138—25)

This invention relates to improvements in housed and/or jacketed conduit systems, and is a division of my co-pending patent application, Serial No. 511,366, filed November 22, 1943, Patent No. 2,570,246.

An object of the invention is to provide a housed and/or jacketed pipe system for conducting fluids, gases, or liquids of all kinds, as well as viscous products, from a supply source to points of use, and retaining such matters in proper and totally effectual and flowable form during and throughout the entire period or periods of such conduction.

It is also an object of the invention to provide a conduit system of the stated character for conducting and distributing different matters, the same being entirely efficient and amply strong to restrain and guide the inner pipe, without detrimental lateral deflection, while and as it is subjected to operating pressure and torsional or similar stresses, and expansion or contraction movement, all within the system casing.

Yet another object of the invention is to provide a conduit system wherein the casing or jacketing members thereof are constructed and assembled in a manner which will so support the inner pipe or pipe line therein as to permit unimpeded and reasonably free longitudinal movement of the latter with relation to the former, in order to compensate for expansion or contraction of said inner pipe; moreover, permit of convenient and effectual installation of the inner pipe in the laid casing or jacket members, and/or its removal therefrom for inspection, repair, replacement, etc. (in part or in whole), all with a minimum expenditure of labor and time.

A still further object of the invention is to provide a conduit system so constructed and assembled that an inner pipe or pipe line housed by the casing or jacketing member or line will be allowed to move or be moved longitudinally (in either direction) and/or rotated or partially rotated about its longitudinal axis, and at the same time, firmly and strongly supported in spaced relation, throughout its length, to the walls of the casing or jacketing member or line.

Furthermore, the invention aims to provide a conduit system wherein the interconnected casing or jacketing members thereof will be materially reinforced by the inner pipe members or line, particularly, because of the means for and the manner in which said inner pipe members or line are supported within the casing or jacketing members; plus the ability of the pipe members or line to remain effectually operatively supported in the casings or jackets even should they fail at points throughout their lengths, as by fracture, etc.

Another equally important object of my invention resides in the provision of a conduit system in which casing or jacketing lines and the inner pipe line housed thereby are so arranged and operatively related as to effect and ensure the forming and constant maintenance of a clear and over-all unimpeded, unobstructed flow-way therebetween entirely throughout the length of the system, interpositioned fittings, joints, valves, branches, etc., notwithstanding.

Yet another object of the invention is to provide an integrated conduit system, one which, because of the construction and arrangement of the component parts thereof, is bodily self-sustaining and operatively self-sufficient and complete within itself and will not require external drainage, special supports, and/or foundations.

A further and important desideratum of the invention resides in providing the system with a novel and highly advantageous means for anchoring the inner pipe line, at spaced points throughout its length, to adjacent portions of the casing or jacketing line whereby to effectually control the extent of expansion and/or contraction longitudinal movement of said pipe line in and with relation to said casing or jacketing line, such anchoring means being made a substantially integral and a strictly self-contained part of the system and being confined entirely within the casing or jacketing line or portions of the same, in sharp contradistinction to those forms of anchors which are dependent for successful operation on outside connection, i. e., connection with pre-prepared bases, beds, etc., outwardly of and beyond a casing or jacketing line.

The foregoing, as well as other objects, advantages, and meritorious teachings of my invention, will be in part obvious and in part pointed out in the following detailed disclosure thereof, when taken in conjunction with the accompanying drawings, it being understood that the forms of the invention presented herein are precise and what are now considered to be the best modes of embodying its principles, but that other or further modifications and changes may be made in specific embodiments without departing from its essential features.

In the drawings:

Figure 1 is an elevation, with parts broken away, illustrating my jacketed conduit system, plus the interpositioning of jacket fittings, branches, etc., therein, whereby installation directional flexibility of the system may be attained.

Figure 2 is an enlarged fragmentary side view, with parts in section, illustrating the construction and assembly of the jackets or casings and inner pipes of the system, the jacket fittings, the spacers which movably support the inner pipes within and in spaced relation to the walls of the jackets and the jacket fittings, and the pipe anchor plates.

Figure 3 is a transverse section taken on the line 3—3 of Figure 2, looking in the direction in which the arrows point, showing one of the spacers and its construction and operative position between the jacket and inner pipe.

Figure 4 is a transverse section taken on the line 4—4 of Figure 2, looking in the direction in which the arrows point, showing one of the pipe anchor plates and its construction and operative position between the jacket and inner pipe.

Figure 5 is a fragmentary longitudinal section through a portion of and illustrating a modified form of my conduit system, i. e., a conduit construction generally consisting of an encased or housed and relatively spaced heat insulated pipe; the adjacent ends of the casing being shown spaced preparatory to completing jointure of the pipe section ends.

Figure 6 is a view similar to Figure 5, in which the joined ends of the pipe sections are bridged or covered by a heat insulating sleeve, i. e., a body of form sustaining heat insulation.

Figure 7 is a transverse section taken on the line 7—7 of Figure 6, looking in the direction in which the arrows point.

Figure 8 is a fragmentary longitudinal section of a portion of the modified form of my invention, showing the heat insulated pipe of the conduit system within the system jacket, and the jacket, and the jacket sections in closed and endwise interconnected position, plus the operative arrangement of one spacer for movably supporting the pipe and its insulating sleeves in lengthwise spaced relation to the system jacket, and Figure 9 is a fragmentary longitudinal section through a portion of the jacketed conduit system, showing the manner in which the inner pipes or line will be firmly and securely supported within the jacket irrespective of a "breakdown" of a portion of such jacket; furthermore, how the supported portion of the pipe line bridging the jacket break will actually reinforce said jacket at and beyond the point of break, and so, avoid complete failure until such time as proper repair is effected.

Referring in detail to my invention and to the drawings illustrating the same, with particular reference to the form of invention shown in the Figures 1, 2, 3, 4 and 9, constituting that which I term a jacketed conduit system, said system, generally, comprises a jacket line consisting of a plurality of jacket sections 1 of appropriate lengths and diameters, flanged at their opposite ends, as at 2, whereby they may be fixedly endwise interconnected in the manner shown in Figures 1 and 2, by passing bolts 3 through the juxtaposed flanges 2, between which, if desired, suitable gaskets 4 may be interposed for obvious reasons.

Different and predetermined directional "laying" or installation of a jacket line composed of the jacket sections 1, is effected by interpositioned different or required types of joint fittings between said jacket sections. In the exemplary showing of Figure 1 of the accompanying drawings, I have shown the use of a number of different types of joint fittings, i. e., T joint fittings 5, 90° L joint fittings 6, and 45° L fittings 7. Of course, still other and known types of angle joint fittings, as well as couplings or fitting sleeves may be used as and when required, for particular directional installation of the jackets 1.

While the joint fittings 5, 6 and 7 are, generally, of formation designs heretofore known in the art, I here call attention to the fact that they are of an improved construction, and so, constitute important component parts of my invention.

The T joint fittings 5, of complemental construction, comprise like cross-sectional semi-circularly shaped sections flanged along their sides at 5' and having coupling flanges 5a on the ends of their respective branches. These sections are matchingly placed together, and constitute cross-sectionally circular fittings, the inside diameters of which substantially correspond to the inside diameters of the jacket sections 1 between which they are interposed, as well shown in Figure 2 of the drawings. Bolts 8 are engaged through complemental openings in the flanges 5' and securely join the fitting sections. Other bolts 9 are engaged through openings in the coupling flanges 5a and serve to connect the medially divided fitting sections 5 to the adjacent flanged ends 2 of the jacket sections 1. Gaskets or packings 4', like those above identified at 4, may be arranged between the juxtaposed fitting section flanges 5', and the coupling flanges 5a and the jacket section flanges 2, for an obvious purpose.

The sectional or longitudinally divided T joint fittings 5 can be varied in their relative arrangement or placement in a jacket line. As shown in Figure 2, two or more may be arranged in adjacent interconnected positions whereby to attain certain directional dispositions of the jacket section 1 joined thereby.

The joint fittings 6 and 7, are constructed to be like the fittings 5, i. e., they are composed of medially and longitudinally divided cross-sectionally semi-circular sections flanged along their sides for connection by bolts, and having coupling flanges on their respective ends, in order that they can be effectually bolted or otherwise connected to the adjacent flanged ends 2 of the jacket sections 1 between which they are interposed (see Figure 1), or otherwise arranged.

The sectional construction of the joint fittings 5, 6 and 7, in addition to providing a most satisfactory method of joining the jacket sections 1 of a jacket line, also, permits convenient and ready access to be had to the interiors thereof merely by removing the connecting bolts 8 and 9 from the flanges of one of the complementally formed sections, whereupon the freed section can be lifted. Since the other section of this fitting will remain intact with the jacket sections, etc., the efficiency and/or security of the joint will not in any way whatsoever be disturbed, and therefore, the jacket line will remain unitary.

Branch pipes 10 are connected to and communicate with the interiors of certain of the jacket sections at appropriate intervals throughout the length or area of the jacket line, serving as outlet ways for heating or refrigerating mediums in those types of jacketed conduit systems where such mediums are flowed through the jacket line, or for air, condensation or gas relief, in other types of installations.

An inner pipe line is provided within and extends longitudinally throughout the line constituted by the jacket sections 1, above described. Said inner pipe line consists of a plurality of endwise disposed sections, generally identified by the numeral 11, of appropriate lengths and diameters. In order to facilitate connection and/or disconnection of the ends of the pipe sections or for other access thereto, it is preferable that said sections shall be of lengths substantially corresponding to or in some instances, somewhat greater than those of the jacket sections 1 receiving the same.

Connection between the adjacent ends of the pipe sections 11 can be effected in various ways well known in the art. In the illustrated embodiment of the invention, these pipe ends are shown connected by welding, as at 12. Other connections between certain of the adjacent ends of the pipe sections may be and are made by joint fittings. In particular, where the pipe line is extended through the branches of a jacket section T joint fitting 5 (see Figure 2), a T joint fitting 13 is interposed in aligned relation between the juxtaposed ends of the pipe sections 11 within said fitting 5, and is connected, by welding 12′ thereto. Different types of pipe joint fittings corresponding to the particular type of jacket section 1 joint fittings 5, 6, 7, etc., in which they are placed, may be used, i. e., the pipe T joint fitting 13 will be used in the jacket section T joint fitting 5, while a 90° L pipe joint fitting will be used in the jacket section L fitting 6, and a 45° L pipe joint fitting will be used in the jacket section L fitting 7, etc.; all as clearly indicated in Figures 1 and 2 of the drawings.

The outside diameters of the inner pipe sections 11 and the joint fittings employed to interconnect the same, are less than the inside diameters of the jacket sections 1 joint fittings 5, 6 and 7. Therefore, it will be seen and appreciated that when such pipe joint fittings are arranged within a jacket line constituted by said sections 1 and fittings 5, 6 and 7, a continuous space or flow-way will be effected therebetween, as hereinafter more fully described.

To support the inner pipe line consisting of the pipe sections 11 and joint fittings 13, within the jacket line, consisting of the jacket sections 1 and the joint fittings 5, 6 and 7, in spaced relation to the latter entirely throughout their respective lengths, and to allow said inner pipe line or portions of the same to move or to be moved longitudinally in either direction and/or to rotate or partially rotate about their longitudinal axes within said jacket line, I engage spacers or supporting devices 14, constructed of strong and durable metal or other suitable material, over and about the sections 11 of the pipe line at predetermined and spaced points throughout its length. Any number of these spacers may be employed, such as conditions or preference may dictate and as hereinafter indicated.

Each of the spacers 14 comprise an annular collar-like body 15 provided on its outer peripheral surface with fixed relatively spaced radially disposed legs 16 having feet 17 preferably integral with their outer free ends.

It is desirable that the diameter of the collar-like body 15 shall be somewhat greater than the outside diameter of the inner pipe sections 11, whereby when engaged thereover and thereabout, said body will be annularly spaced from the adjacent portion of an inner pipe section (see Figure 3). Jack-screws 18 are engaged through suitable screw-threaded openings formed in the body 15 in substantially equi-spaced relation. The screws are turned inwardly into engagement with portions of the adjacent pipe section 11, thereby immovably connecting the spacer to the same. By adequate adjustment of the jack-screws 18, the body 15 of the spacer will be fixed in annularly spaced relation to the pipe section 11, as above described. Thus, heat or cold transmission between the jacket sections 1 and the pipe sections 11, via the spacer 14, will be reduced to minimum.

If desired, toes 17a, formed of lead or similar material, are inset in the feet 17 of the spacer legs 16 and serve to reduce friction between said feet and adjacent portions of the inner periphery of the jacket section 11 upon longitudinal or transverse movement of the inner pipe 11 and the spacer 14.

As hereinbefore stated, under certain conditions of use or operation of the improved jacket conduit system, the inner pipe line, composed of the sections 11, will move or shift longitudinally in either direction in the jacket line receiving the same, i. e., by expansion or contraction of the inner pipe line through the transmission thereto of heat or cold of different temperatures. It is essential that the extent of this longitudinal movement shall be controlled and/or limited. To effect such, I mount anchors 19 on the sections 11 of the inner pipe line at predetermined points throughout its length, in the manner presently described.

The anchors 19 are of complemental construction. Each comprises a circular plate, preferably of steel of suitable gauge, having a substantially circular opening formed centrally of the same, adapted to rather snugly receive a pipe section 11 therethrough. Other openings or ports 20, of appropriate size and shape, are formed in the anchor plate outwardly of its pipe section receiving central opening, and particularly, in those portions of said plate which transversely span the space (flow-way) between the outer periphery of the inner pipe 11 and the inner periphery of the jacket 1.

The anchor plates 19 are positioned transversely of certain of the adjacent and flanged ends 2 of the jacket sections 1, and have their respective outer portions (beyond the outer peripheries of said sections 1) flatly engaged between the jacket section end jointure effecting flanges 2. Thereupon, the anchor plate 19 and the flanges 2 are securely interconnected by bolts 3 passed through said flanges, as heretofore described, and through appropriate openings in the anchor plate. And as above stated, gaskets or packings 4 may be arranged between the jacket section flanges 2 and adjacent portions of the anchor plate, to ensure fluid-tight jointure.

Permanent and positive connection between the anchor plate 19 and the inner pipe section 11 is made, preferably, by welding, as at 21.

Anchor plates 19, as above, are arranged in the jacket sections 1 of the jacket line at appropriate intervals of from fifty feet to upwards of three hundred feet, throughout the length of said jacket line, while to afford sufficient compensation and/or relief for longitudinal movement (expansion and/or contraction) of the inner pipe sections 11 of the inner pipe line in the jacket line of the system, suitable and known types of expansion joints, as for example, a bellows type of expansion joint indicated at 19′, are arranged or interposed in said inner pipe line at desirable points throughout its length. Of course, different types of expansion joints, all well known in the art, may be substituted for the, or some of the bellows type expansion joints 19', as may be desired. In consequence, the extent of longitudinal expansion and/or contraction of the inner pipe line (the interconnected inner pipe sections 11) between the installed anchor plates 19, will be effectually controlled in that longitudinal movement of the pipes 11 will be resisted at their various points of anchorage to the jacket line (jacket sections 1) by means of said anchor plates. However, those portions or lengths of the inner pipe line between the above referred to points of anchorage thereof will be allowed sufficient longitudinal expansion and/or contraction to prevent their detrimental distortion or fracturing. Furthermore, because of the openings or ports 20 formed in those portions of the anchor plates 19 which span the flow-way between the jacket sections 1 and the inner pipe sections 11, it is manifest that said flow-way will not be obstructed, and so, will permit the unimpeded flow of fluid, etc., throughout the same.

While I have hereinbefore described the anchor plate or plates 19 as functioning to effect control of the extent of longitudinal movement of the inner pipe line or inner pipe sections, as through expansion or contraction of the same, it is to be understood that said plates will also equally well serve to limit or control the extent of longitudinal movement of the jacket line or jacket sections 1 with relation to the pipe line or pipe sections 11, especially, in those instances where the jacket sections 1 will expand or contract by the transmission of high temperatures thereto from fluids, liquids, etc., passing through the aforesaid flow-way, in contradistinction to the passage of high temperature fluids or liquids through the inner pipe line or inner pipe sections 11.

The anchor plates 19, under certain conditions, may be and preferably are interpositioned between adjacent or meeting ends of the jacket sections 1 and the jacket section joint fittings, 5, 6 and 7. In point, reference is made to Fig. 2, which shows the positioning of anchor plates 19 between the flanged ends 2 of jacket sections 1 and the flanged ends of the longitudinally and medially divided T joint fitting 5. The arrangement and connection of the anchor plates 19 corresponds with that hereinabove described.

Referring now to the modified form of my invention illustrated in Figures 5, 6, 7 and 8 of the accompanying drawings, I characterize the same as a conduit system. Said conduit system is distinguished from the previously described jacketed conduit system in that it does not effect the provision of a jacketed flow-way or area about and along its inner conducting pipe or pipe line, through which heating or cooling mediums are flowed. To the contrary, my modified improved conduit system is primarily intended to house and protect a heat insulated inner pipe line which, in turn, is supported in and extends longitudinally through the system housing or casing line in annularly spaced relation to the inner periphery thereof and in a manner to provide, between the pipe line and the housing line, a continuous, uninterrupted and unimpeded flow-way for internal pressure relief, drainage, etc.

To the above indicated ends, the conduit system, generally, comprises a housing line consisting of a plurality of casing sections 22 arranged in endwise adjacent relation (see Figure 8), the adjacent ends of the casing sections being flanged at 23 to permit their interconnection, as hereinafter more fully described, and an inner pipe line consisting of a plurality of endwise adjacent and interconnected inner pipe sections 24 movably supported in and disposed longitudinally of and through the casing line in spaced relation thereto.

To movably support the inner pipe line (the pipe sections 24) within the casing sections 22, in annularly spaced relation thereto, I fixedly engage spacers 14', similar to the heretofore described spacers 14, about and over said inner pipe line at predetermined intervals throughout its length. The outer ends or feet of the radially disposed legs of the spacers 14' have movable bearing engagement with adjacent portions of the inner periphery of the casing sections. Consequently, the inner pipe line will be allowed longitudinal movement, in either direction, with relation to the casing sections, and therefore, will be permitted to compensate for expansion or contraction thereof, occasioned or caused by the temperatures and temperature variations of matters flowed therethrough. Furthermore, when matters (fluids, gases, liquids, etc.) are flowed through the inner pipe line under high pressures, said pipe line will oftentimes be caused to partially rotate or turn on itself or about its longitudinal axis. At and during such times, the spacers 14' connected to the affected portions of the inner pipe line, will be permitted to correspondingly rotate or turn in the casing line, and thus, will avoid damage to said inner pipe line; moreover, will ensure the continued support of the pipe line in its aforesaid annularly spaced relation to the inner peripheral surface of the casing line throughout the entire length of the conduit system.

Form sustaining insulation material 25 is engaged entirely about the inner pipe sections 24 in the casing sections 22. The outside diameter of this material 25 is less than the inside diameter of a receiving casing section 22. Therefore, an annular space or flow-way is effected between the material and the casing section throughout its length, particularly, because of its support from the pipe section 24 which, in turn, is supported throughout its length by the spacer or spacers 14'.

The form sustaining insulation 25 is extended longitudinally over and about the inner pipe section into abutting engagement with both sides of the spacer or spacers in the casing section 22, as indicated in Figure 8, for an obvious purpose.

The lengths of the inner pipe sections 24 are somewhat greater than those of the casing sections 22. Therefore, the juxtaposed end portions of the sections 24, prior to joining or connecting the casing section flanges 23, will extend from their respective casing sections 22, in the manner shown in Figure 5 of the drawings, and will be conveniently and readily accessible whereby, following endwise engagement therebetween, they can be effectually connected by welding 26, or other suitable means, in a minimum of time.

Following connection of the inner pipe section ends, at 26, the extended insulation-bare end portions of the inner pipe sections 24, are covered by complementally formed cross-sectional semicircular form sustaining insulating pieces 27 which are secured thereto and thereabout by bands or ties 27a, in the manner shown in Figures 6 and 7. The over-all outside diameter of the pieces 27 corresponds to and is contiguous with that of the form sustaining insulation 25. Thus, when the jointure flanges 23 are brought into abutting contact by longitudinally moving one or both the casing sections 22, in the proper direction, and are fixedly interconnected by bolts 28 passed therethrough, a continuous, uninterrupted and unimpeded flow-way will be effected over and about the same.

The continuous, uninterrupted and unimpeded flow-way between the insulation covered inner pipe line or inner pipe sections 24 and the inner peripheral surface of the casing line composed of the interconnected casing sections 22, provides an effectual internal pressure relief or drainage means. For example, should failure of the inner pipe line occur and leakage therefrom be permitted, a destructive accumulation of built-up internal pressure within the casing line will be prevented, in that such pressures will be distributed through the casing line and outletted therefrom, as through the use of outlet ways or branches, such as shown in connection with the heretofore described jacketed conduit system and identified by the numeral 10. Furthermore, should condensation occur within the casing line, such condensation will be conveyed via the aforesaid flow-way and outletted therefrom, by means of suitable outlets, such for example as those above identified by the numeral 10.

As in the jacketed conduit system heretofore described, the conduit system shown in Figures 5–8, is provided with anchor plates like those identified by the reference numeral 19. Said anchor plates are engaged over and about the lengths or sections 24 of the inner pipe line at suitable and effective intervals throughout the over-all length of the inner pipe line—say, at intervals of from fifty to upwards of three hundred feet. The plates 19 are welded or otherwise securely connected to adjacent portions of the inner pipe sections 24, while their outer portions are flatly engaged between certain of the adjacent jointure flanges 23 of the casing sections 22 constituting the housing line, in the same manner as shown in Figures 2 and 4 of the drawings illustrating the jacketing conduit system.

Where the conduit system includes the use of joint fittings, such as shown in Figures 1 and 2 of the drawings and identified by the numerals 5, 6 and 7, for directional disposition thereof, it will, of course, be understood that anchor plates 19 can be arranged and secured between said fittings and certain of the adjacent ends of the casing sections 22, in that manner shown in said figures.

By the same token, to provide direct relief for the longitudinal expansion or contraction movement of the inner pipe line, i. e., to compensate for such movement, suitable types of expansion joints, such as shown in Figure 2, or other and well known forms thereof, are preferably arranged or interposed at suitable points therein.

My improved jacketed conduit system and/or conduit system can be constructed and installed in different ways for different uses, and for different characters of directional conduction or distribution of those matters flowed through either.

In Figure 1 of the accompanying drawings, I have illustrated a jacketed conduit system installation, primarily intended for use in conducting fluids, liquids and/or heavy viscous matters through the inner pipe line constituted by the pipe sections 11 and their various fittings. The system is equally well suitable for surface, subterranean, marine, or above terrain surface installation. Different directional installation of the system may, of course, be effected by suitable arrangement and assembly of the required number of jacket sections 1 and inner pipe sections 11, plus joint fittings, as above described, and spacers 14 and anchors 19.

The matters flowed through the inner pipe line can be maintained at predetermined temperatures desirable or necessary for their proper form retention or flowability, as in the case of viscous matters, by the flowing of a suitable exchange medium (heating or refrigerating) through the continuous, unimpeded flow-way between the inner pipe line 11 and the jacket line 1.

With other types of installations of the jacketed conduit system, the jacket line can be most advantageously used as a casing or tunnel for the inner pipe line, whereby to protect the latter, and also, to provide a definite factor of safety, as in the event of leakage in the pipe line, in the event of which the jacket line receiving such leakage will function as a secondary conductor therefor until necessary repairs are made.

In the installation illustrated by Figure 1, connection between the jacketed conduit system and supply and/or receiving means may be effected by connecting reducer fittings 29 to the outer ends of the adjacent jackets 1 and extending the pipe sections 11 therethrough into connection with such means 30, 31 and 32. If desired, control valves, such as the one identified by the reference numeral 33, can be provided to the extended pipe section portions for an obvious purpose.

The conduit system shown by Figures 5, 6, 7 and 8 of the drawings is, more generally, intended for surface, subterranean and/or marine use, though it is manifest that it is not limited to such usage. The inner pipe lines 24 and the housing or casing lines 22 will, of course, be arranged and assembled in the manner hereinbefore described to effect the desired directional installation, i. e., an installation such as shown in the jacketed conduit system installation by Figure 1.

The conduit system is primarily intended for the conduction and distribution of highly heated matters by and through its inner pipe line, during which the temperatures of these matters will be maintained at the desired or required degree. Under such operation conditions, it is essential that heat losses be kept at minimum. Therefore, the sections 24 of the inner pipe line are provided with the heretofore described form sustaining heat insulation 25, and furthermore, said sections are supported in annularly spaced relation to the inner peripheral surfaces of the casing sections 22 through the spacers 14 which, it will be borne in mind, have only minimum supporting contact or engagement with adjacent portions of their respective pipe line sections through the adjustable jack screws 13 (see Figure 8).

Because of the fact that the inner pipe line of the sections 24 and their insulation 25 are supported on the relative spaced spacers 14 within the housing line sections 22, in annularly spaced relation to the inner peripheral surfaces of the latter, a continuous unimpeded flow-way is effected between said sections 22 and the outer peripheral surfaces of the inner pipe section carried insulation 25. This flow-way is also maintained by and between the joint fittings of the inner pipe line sections and the housing sections. Accordingly, and as described, an effectual over-all drainage means is had for condensation, liquid leakage, etc., and moreover, the accumulation and presence of detrimental pressures within the housing line is positively eliminated due to the constant relief therefor, i. e., the aforesaid flow-way.

As shown in Figure 9 of the drawings, the jacket line 1 of the jacketed conduit system provides an extremely strong and durable means for housing the inner pipe line 11 or sections thereof. Due to the fact that the inner pipe line 11 is supported within the jacket line on the aforesaid relatively spaced spacers 14, it is of importance to here note that relative inter-bracing of or between the jacket line and the inner pipe line is effected, i. e., the jacket line 1 will effectually brace or reinforce the inner pipe line 11, and said inner pipe line 11, because of its disposition in and through the jacket line 1, will brace or reinforce it. Consequently, should the jacket line fail or break at a point between certain of the relatively spaced spacers 14 supporting the inner pipe line 11 within said casing line, it will be readily seen and appreciated that the inner pipe line will remain supported and will effectually bridge or span the failing or broken portion of the jacket line or section, indicated at 34. In consequence, whereas failure of the jacket line will occur, a resultant failure of the inner pipe line will be successfully prevented as between the time of the failure and its repair. By the same token, if, for any reason, the inner pipe line 11 or a section thereof, shall become broken or otherwise operatively impaired, it will be understood that said line will, nevertheless, be adequately supported within the particularly adjacent portion of the jacket line, and furthermore, that said jacket line will ensure maintenance of the broken or impaired inner pipe line portion in supported position so that the remainder thereof can be moved longitudinally of the jacket line, to compensate for either expansion or contraction, or to enable convenient and ready removal of the damaged portions of the inner pipe line for repair or replacement.

Due to the fact that the heretofore described joint fittings 5, 6 and 7 of the system jackets or housings are substantially contiguous with such jackets or housings interconnected thereby, and also, that these joint fittings are preferably constructed of heavy, strong and durable material, they will produce, in combination with the jackets or housings, a highly efficient longitudinally stress resistant unitary structure. Being securely connected in co-axial alignment to adjacent ends of the jacket and/or housing sections making up a line, these joint fittings will actually reinforce such line or lines, in that they will amply resist those longitudinal stresses, in either direction, which may be expected to and will be imparted thereto from the jacket or housing line per se, and in consequence, will eliminate detrimental or disastrous joint failures, as well as ensure constant and dependable maintenance of the all-important continuous flow-way between the jacket and/or housing lines and the inner pipe lines.

It may be here noted that the method of installing and assembling a conduit system embracing my invention is a beneficial, new, useful and meritorious contribution to and advance in the art. As hereinbefore stated, the lengths of the inner pipe sections are greater than those of the casing or jacket sections. In consequence the opposite end of the pipe sections within their respective casing or jacket sections extend outwardly of and beyond the opposite ends of the latter. Being so extended and exposed, the adjacent end portions of the pipe sections can be conveniently and readily adjusted or moved to bring their ends into abutting or meeting relation, following which, such ends can be as advantageously connected, as by welding (hereinbefore described), or other suitable means.

Following connection of the meeting ends of the exposed and extended portions of the inner pipe sections, one of the substantially juxtaposed casing or jacket sections is moved or shifted so as to bring its inner or near end into meeting engagement with the corresponding end of the adjacent casing or jacket section. Thereupon, connection between the flanged ends of said casing or jacket sections, such as heretofore described, or other effectual and satisfactory union is made.

The connections between the inner pipe section ends and the casing or jacket ends, it will be noted upon reference to Figures 2, 5, 6 and 8 of the accompanying drawings, are relatively vertically disaligned or staggered, i. e., the inner end portion of the aforesaid moved or shifted casing or jacket will overlie the connection between the meeting ends of the inner pipe sections (see Figures 2 and 8). Being thus relatively positioned, it will be understood and appreciated that the inner pipe section end and casing or jacket section end connections will afford materially greater strength and resistance to deterioration, rupture or other failure occasioned by applied stresses.

In completing the installation and assembling of my improved conduit system, after the connection of the aforedescribed inner pipe end and casing or jacket end connections, the inner pipes and casings or jackets of the succeeding sections of the system line are likewise connected and disposed. During the assembly, as the casing or jacket sections are succeedingly moved into end meeting engagement (following end connection of the inner pipe sections) with the immediately preceding ones and connected thereto, it will be seen and appreciated that the pipe line constituted therewithin by the inner pipe sections will progressively grow from and out of one end of the casing or jacket section constituted line. Such an outgrowth of the inner pipe line is, oftentimes highly advantageous and desirable, as where entrance and passage of the inner pipe line through a wall is required, or where certain lengths of the pipe line beyond its casing or jacket line are needed for the connection and/or installation of devices or appurtenances thereto or therein.

When the form of conduit system shown in Figures 5–8 is installed, I practice the above described method of assembly and in addition, effect the use of the form sustaining insulating material or sleeves 25 in the following described manner.

The inner pipe sections 24 are supported in spaced relation to and within their respective casing sections 22, as hereinbefore described, by means of a desired number of relatively spaced spacer supports 14'. It is preferable that in a single length of casing section 22 and on a length of pipe section 24 engaged in and through the former, a plurality of spacers 14' shall be employed. One of said spacers is engaged with and locked, by its screws 18, to a substantially medial or an intermediate portion of the pipe section. Other spacers 14' are likewise mounted and connected one on and in proximity to either end of said pipe section. Thus, it will be seen that the pipe section 24 will be supported within and throughout the length of the casing section 22 in spaced relation thereto much in the manner shown in Figure 2 of the drawings.

Such an assembly and supporting of the pipe section 24 within the casing section 22 is advantageous in shipping or transporting of the sections, particularly in affording space conservation and incident economies, plus handling facility, etc.

When assembling the insulating conduit, the spacers 14' on the opposite end portions of the pipe section 24 are removed therefrom. At this time and with the pipe section supported medially or intermediately of its ends within the casing section by the remaining spacer 14', a length or lengths of form sustaining insulating material or sleeves 25 are slid onto and over the pipe section on the opposite sides of said remaining spacer. The inner ends of the thus opposed insulating sleeves 25 are abuttingly engaged with the adjacent sides of the remaining and intermediate spacer (see Figure 8). Thereupon, with the outer ends of the insulating sleeves disposed in proximity to the adjacent ends of the pipe section 24, said sleeves are secured against movement longitudinally of said pipe section by reengaging the previously removed spacers 14' on or over the opposite portions of the pipe section and with adjacent ends of the insulating sleeves, and locking the same thereto by their respective screws 18.

As hereinbefore described, where the meeting ends of pipe sections 24 are connected, as indicated at 26, these particular portions may be and preferably are covered by the form sustaining insulating pieces or semi-sleeves 27 secured by ties 27ᵃ as shown in Figures 6 and 8.

In instances where the spacers 14' are not engaged with the outer or opposite end portions of a pipe section 24 within a casing section 22, but where said spacers are positioned somewhat inwardly of the casing section opposite ends, insulating material pieces or sleeves 25 are engaged over said outer or opposite end portions of the pipe section outwardly of the spacers and abutting the same. The outer ends of these sleeves terminate substantially at the adjacent ends of the casing sections, as shown in Figures 5 and 6. The form sustaining insulating pieces or semi-sleeves 27 are then engaged over and about the extended and connected end portions of the inner pipe sections 24 and secured by the ties 27ᵃ.

Since the pieces 27 abuttingly engage the adjacent ends of the adjacent sleeves 25, said sleeves will be prevented from having longitudinal shifting or sliding movement on the pipe section or sections 24.

Following the connection of the pipe section ends and their insulation, as described, one of the casing sections 22, is moved longitudinally into end contact with the end of the preceding or adjacent casing section and connected thereto, while the succeeding casing sections are similarly moved and connected as heretofore described.

From the foregoing, it will be understood and appreciated by industry skilled artisans, that systems embracing my invention will be long lived; that the inner pipe lines of both forms of the system (inclusive of the joint fittings therein) will have a longitudinally continuous and unimpeded flow-way over and about the same; that the inherent strength and stiffness of the jacket and/or housing line will ensure its maintenance in proper and functioning form notwithstanding subjection of the same, during use, to compression and/or tension stresses which may well exceed thirty thousand (30,000) pounds, and so, will effectually confine and hold the inner pipe line straight or substantially straight throughout its over-all length; that the free-floating method of supporting the inner pipe line within and lengthwise throughout the stiff-walled jacket or housing line permits the pipe to move freely longitudinally of said jacket or housing line in either direction, as when interconnected sections of the pipe line expand or contract during use; that the inner pipe line will be permitted to rotate or partially rotate, under the urge of high torsional stresses, within the jacket or housing line without in any manner detrimentally affecting the spaced supporting of said inner pipe line with relation to said jacket or housing line; that by reason of the mounting of the inner pipe line on the spacers 14—14' within the jacket or housing line, said inner pipe line or sections thereof can be slidably inserted or removed therefrom, thus facilitating installation, inspection, repair, replacement, etc.; that lateral thrust, if and when applied to the inner pipe line or portions thereof, will be successfully resisted and restrained with an ample operational safety margin, by means of the hereinbefore described spacers 14—14' received within the jacket or casing line and connected to the inner pipe line, preferably, at points approximately nine feet apart in standard lengths of jackets or casings, and therefore, damaging lateral distortion of the pipe line will be prevented and the line will be retained straight and allowed free to move longitudinally of and within the jacket or casing line; that the anchors or anchor plates 19 are an integral part of the line system, requiring no special concrete block or structural metal supports and allowing the application of insulation material about the pipe sections 11—24 of the conduit system, directly up to the anchor plate or plates, thus reducing radiation loss to minimum, and moreover, eliminating the need for manholes at anchoring points in either the jacket or housing lines, and generally, that my improved jacketed or housed conduit system is an integrated one—a system complete within and entirely self-sufficient to itself.

I claim:

1. A conduit system comprising lengths of interconnected one piece cylindrical casing and pipe sections in end to end relation, spacing means secured to and movable with said interconnected pipe sections and longitudinally slidably and rotatably supporting the same in substantially uniformly spaced relation to the inner sides of the walls of said casing sections with said spacing means being slidable along said inner sides, and form sustaining insulation arranged about said interconnected pipe sections and movable therewith and having the outer surface thereof arranged in spaced relation to said inner sides of said interconnected casing sections whereby a continuous free space is provided between said casing sections and insulation throughout the entire lengths of said casing and pipe sections, said interconnected pipe sections, spacing means and insulation being longitudinally receivable in and removable from said interconnected casing sections as a unitary assembly.

2. A conduit system comprising lengths of interconnected substantially inflexible one piece cylindrical casing and pipe sections in end to end fluid tight relation, longitudinally spaced support means arranged circumferentially about and connected to said interconnected pipe sections having outer portions extending toward and slidable along the inner sides of said casing sections to longitudinally slidably and rotatably support said pipe sections in spaced relation within said interconnected casing sections, and form sustaining insulation supported on and arranged about said interconnected pipe sections and movable therewith and having the outer surface thereof in spaced relation to said inner sides of said casing sections substantially throughout the lengths of the same whereby a continuous free space is provided between said casing sections and insulation throughout the entire lengths of said casing and pipe sections, said interconnected pipe sections, support means and insulation being longitudinally movable in either direction and being longitudinally receivable in and removable from said interconnected casing sections as a unitary assembly.

3. A conduit system including lengths of one piece cylindrical casings and pipes received in and longitudinally of the same in spaced relation thereto, connecting means securing said casings and pipes in end to end fluid tight relation, means secured to and movable with said pipes and slidable along the inner surfaces of said casings for supporting the former within the latter in spaced relation, and form sustaining insulation about and movable with said pipes having its outer surface spaced from said inner surfaces of said casings whereby a continuous free space is provided between said casings and insulation throughout the entire length of said casings and pipes, said pipes, supporting means and insulation being longitudinally receivable in and removable from said interconnected casing as a unitary assembly.

4. A conduit system including lengths of one piece cylindrical casings and pipes received in and longitudinally of the same in spaced relation thereto, connecting means securing said casings and pipes in end to end fluid tight relation, means secured to and movable with said pipes and slidable along the inner surfaces of said casings for supporting the former within the latter in spaced relation, form sustaining insulation about and movable with said pipes having its outer surface spaced from said inner surfaces of said casings whereby a continuous free space is provided between said casings and insulation throughout the entire length of said casings and pipes, and anchoring means about and connected to portions of said pipes at intervals throughout their lengths with the outer portions connected to adjacent portions of said casings to transmit stresses from said pipes to said casings and conversely, said pipes, supporting means and insulation being longitudinally receivable in and removable from said interconnected casings as a unitary assembly when said anchoring means is disconnected from said pipes.

5. A conduit system including lengths of casings in endwise relation, an inner pipe line within and extending through said lengths of casings, connecting means securing said casings in end to end fluid tight relation, means secured to and movable with said inner pipe line and slidable along the inner surfaces of said casings for slidably supporting the former within the latter in spaced relation, the spacing of said pipe line from said casings constituting a flow-way therebetween continuously between the lengths of casings and pipe line, and sectional joint fittings connected to adjacent spaced ends of said casings the interiors of which substantially correspond to the internal areas of said casings and are contiguous therewith and radially spaced from said pipe line to continue said flow-way therethrough.

6. In a conduit, coaxial pipe sections arranged one inside another, and an elbow coupling on one end of one section having a pipe section extending into the same through one side thereof and connected to one end of another pipe section.

7. A conduit system for fluid transportation comprising, in combination, a plurality of endwise abutting one piece cylindrical casing sections of uniform length, a plurality of endwise abutting pipe sections of uniform length within said casing sections, each pipe section being longer than a casing section, coupling means interconnecting the abutting ends of said casing sections and of said pipe sections in fluid tight relation, and guide means secured in spaced apart relation along and movable with said pipe sections and slidable along the inner surface of said casing sections to hold said interconnected pipe sections in spaced relation to said interconnected casing sections thereby providing a flow-way therebetween continuously around and throughout said interconnected lengths of said sections and slidably mounting said pipe sections relative to said casing sections.

8. A conduit system for fluid transportation comprising, in combination, a plurality of endwise abutting one piece cylindrical casing sections of uniform length, a plurality of endwise abutting pipe sections of uniform length within said casing sections, each pipe section being longer than a casing section, coupling means interconnecting the abutting ends of said casing sections and of said pipe sections in fluid tight relation, guide means secured in spaced apart relation along and movable with said pipe sections and slidable along the inner surfaces of said casing sections to hold said interconnected pipe sections in spaced relation to said interconnected casing sections thereby providing a flow-way therebetween continuously around and throughout said interconnected lengths of said sections and slidably mounting said pipe sections relative to said casing sections, and a layer of insulation surrounding said interconnected pipe sections and movable therewith and having the outer surface thereof spaced from the inner surface of said interconnected casing sections whereby said flow-way reduced in cross-sectional area is maintained.

9. A conduit system for fluid transportation comprising, in combination, a plurality of endwise abutting one piece cylindrical casing sections of uniform length, a plurality of endwise abutting pipe sections of uniform length within said casing sections, each pipe section being longer than a casing section, coupling means interconnecting the abutting ends of said casing sections and of said pipe sections in fluid tight relation, guide means secured in spaced apart relation along and movable with said pipe sections and slidable along the inner surfaces of said casing sections to hold said interconnected pipe sections in spaced relation to said interconnected casing sections thereby providing a flow-way therebetween continuously around and throughout said interconnected lengths of said sections and slidably mounting said pipe sections relative to said casing sections, a layer of insulation surrounding each pipe section and having a length about equal to the length of an outer casing section, and a layer of insulation around the end portions of said pipe sections not covered by the first mentioned layer of insulation, the outer surfaces of said layers of insulation being spaced from the inner surface of said interconnected casing sections whereby said flow-way reduced in cross sectional area is maintained.

10. A unit for use in making up a conduit system for fluid transportation comprising, in combination, a one piece cylindrical casing having a uniform internal diameter throughout the major portion of its length, a fluid conducting pipe within and longer than said casing whereby the ends of the former project beyond the ends of the latter, guide means intermediate the ends of said casing and secured to said pipe and slidable along the inner surface of said casing to hold said pipe in spaced relation to said casing thereby providing an annular flow-way therebetween and slidably mounting said pipe within said casing, and a layer of insulation around said pipe and extending to the ends of said casing leaving the ends of said pipe bare, the outer surface of said layer of insulation being spaced from the inner surface of said casing whereby said flow-way reduced in cross sectional area is maintained.

11. A unit for use in making up a conduit system for fluid transportation comprising, in combination, a one piece cylindrical metallic casing having a uniform internal diameter throughout the major portion of its length and capable of withstanding substantial longitudinal tension and compression stresses with the ends arranged to be placed in abutting relation and joined in fluid tight relation to like ends of like casings, a fluid conducting pipe within and longer than said casing whereby the ends of the former project beyond the ends of the latter, guide means intermediate the ends of said casing and secured to said pipe and slidable along the inner surface of said casing to hold said pipe in spaced relation to said casing thereby providing an annular flow-way therebetween and slidably mounting said pipe within said casing, and a layer of insulation around said pipe and extending to the ends of said casing leaving the ends of said pipe bare, the outer surface of said layer of insulation being spaced from the inner surface of said casing whereby said flow-way reduced in cross sectional area is maintained.

12. A conduit system comprising lengths of interconnected one piece cylindrical casing and pipe sections in end to end relation, spacing means secured to and movable with said interconnected pipe sections and longitudinally slidably and rotatably supporting the same in substantially uniformly spaced relation to the inner sides of the walls of said casing sections with said spacing means being slidable along said inner sides, and conduit means connected to certain of said casings and communicating with the space between the same and said pipe for circulating therethrough a heat transfer medium.

13. A conduit system comprising lengths of interconnected one piece cylindrical casing and pipe sections in end to end relation, spacing means secured to and movable with said interconnected pipe sections and longitudinally slidably and rotatably supporting the same in substantially uniformly spaced relation to the inner sides of the walls of said casing sections with said spacing means being slidable along said inner sides, the space between said casing and pipe sections constituting a flow-way therebetween continuously throughout the interconnected lengths of casing and pipe sections, and an anchor plate secured only to one of said pipe sections in a run of several pipe sections and extending radially outwardly therefrom between juxtaposed casing sections for limiting the movement of said one pipe section relative to said juxtaposed casing sections and transmitting to the latter longitudinal mechanical stresses developed in the pipe sections on either side of said anchor plate.

14. A conduit system for fluid transportation comprising, in combination, lengths of fluid tight interconnected casings and pipes, and guide means secured to said interconnected pipes at intervals therealong for spacing the same from said casings; each guide means including a collar-like body spaced from the pipe associated therewith, a plurality of studs extending radially inwardly from said body and gripping at their inner ends the outer surface of said pipe whereby there is a minimum of heat transfer therewith, and a plurality of legs extending radially outwardly from said body having feet at their outer ends arranged to engage slidably the inner surface of the casing associated therewith; said interconnected pipes and guide means being collectively and longitudinally receivable in and removable from said interconnected casings.

EDWARD W. KAISER.

References Cited in the file of this patent

UNITED STATES PATENTS

| Number | Name | Date |
|---|---|---|
| 316,967 | Heber | May 5, 1885 |
| 340,691 | Aldrich | Apr. 27, 1886 |
| 444,533 | Holden | Jan. 13, 1891 |
| 1,217,543 | White | Feb. 27, 1917 |
| 1,481,255 | Cumfer | Jan. 22, 1924 |
| 1,909,075 | Ricker et al. | May 16, 1933 |
| 2,003,838 | Smith | June 4, 1935 |
| 2,016,375 | Kipnis | Oct. 8, 1935 |
| 2,197,243 | Moran | Apr. 16, 1940 |
| 2,209,152 | Daniels | July 23, 1940 |
| 2,330,966 | Gottwald et al. | Oct. 5, 1943 |
| 2,360,067 | McLeish | Oct. 10, 1944 |
| 2,378,214 | Gottwald | June 12, 1945 |
| 2,423,574 | Barrett | July 8, 1947 |
| 2,427,685 | Midtlying | Sept. 23, 1947 |
| 2,475,635 | Parsons | July 12, 1949 |
| 2,592,574 | Kaiser | Apr. 15, 1952 |